United States Patent Office 2,763,983
Patented Sept. 25, 1956

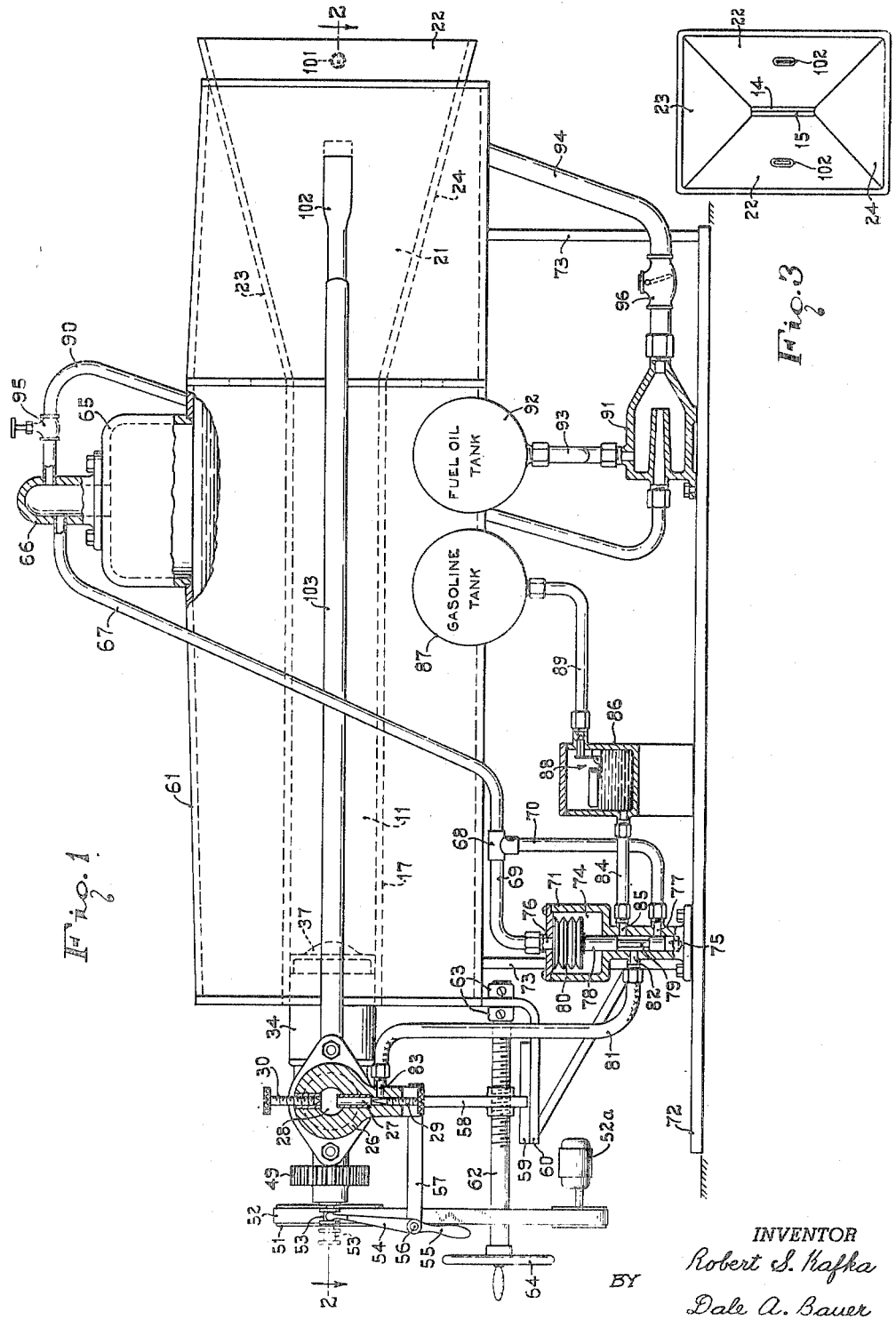

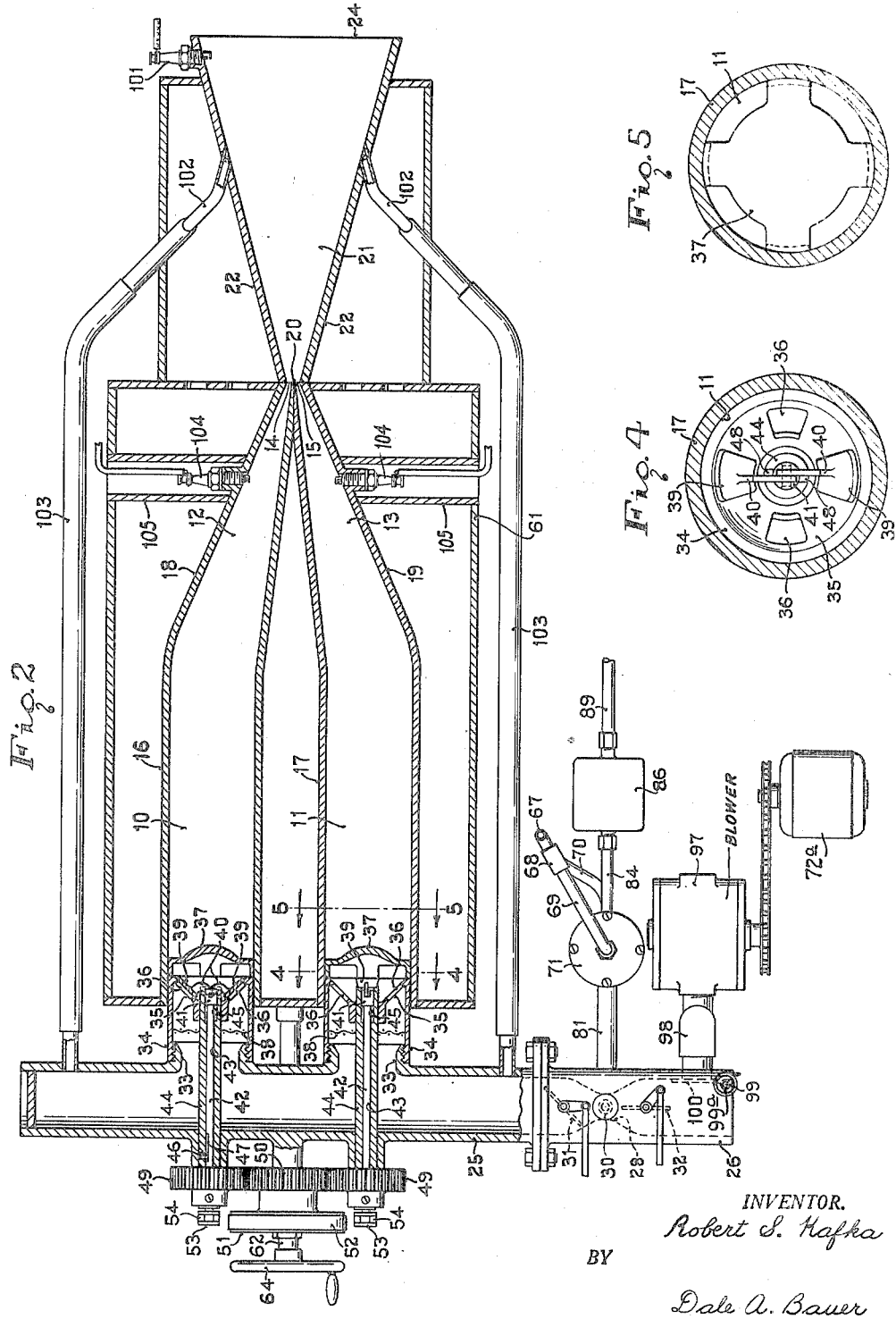

2,763,983

COMBUSTION TYPE POWER GENERATING APPARATUS

Robert S. Kafka, Woodside, N. Y.

Application April 2, 1946, Serial No. 659,121

15 Claims. (Cl. 60—35.6)

This invention relates to power generating apparatus and more particularly to an explosion combustion type of fuel burner which produces or generates gases of high velocity for motive and destructive power, heating, and other purposes.

One of the objects of the present invention is to provide a novel power generating apparatus which will deliver blasts or jets of gases of high velocity and momentum in continuous rapid succession.

Another object of the invention is to provide a novel power generating apparatus wherein the jets of high velocity gases generated thereby are discharged through a diverging nozzle so that a high concentration of power will be obtained.

Another object is to provide a power generator of the above character which through novel construction thereof is self-charging and self-firing, thus eliminating the use of fuel charging and ignition means.

Still another object is to provide a novel power generating apparatus which is simple in construction and can be throttled to control at a reasonable constant efficiency the effective power of the high velocity gases generated thereby and discharged therefrom.

A further object is to provide a novel power generating apparatus wherein the diverging nozzle thereof is equipped with power boosters, resulting in a material increase in the velocity and energy of the gases discharged therefrom.

A still further object is to provide a novel power generating apparatus having a plurality of combustion chambers of such conformation and arrangement that the charging and firing of one chamber is dependent upon and effected by the firing of the other chamber, and vice versa.

Another object is to provide a novel power generating apparatus wherein liquid fuel is utilized as a coolant medium which is caused to vaporize and thereafter injected into the combustion chambers of said burner and used as the operating fuel therefor.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a side elevation partly in section, and with parts broken away, showing one form of a power generating apparatus which embodies and is adapted to operate in accordance with the present invention;

Fig. 2 is a horizontal section on the line 2—2 of Fig. 1;

Fig. 3 is an end view on a slightly reduced scale of the power generator shown in Figs. 1 and 2 and looking from the right thereof;

Fig. 4 is an enlarged detail section on the line 4—4 of Fig. 2; and,

Fig. 5 is an enlarged detail section on the line 5—5 of Fig. 2.

Referring first to the embodiment illustrated by way of example in Figs. 1 to 5 of the drawings, the novel power generating apparatus comprehended by the present invention comprises two elongated combustion or explosion chambers 10 and 11 which are circular in transverse cross section and are of a predetermined area and length. The chambers 10, 11 are disposed in side by side relation and are formed with converging exhaust throats 12 and 13, respectively, which are of a predetermined length and gradually decrease in cross-sectional area from the inlet ends thereof and terminate in relatively narrow, vertically extending, rectangular shaped openings 14 and 15, respectively. Chambers 10 and 11 are formed by elongated cylinders 16 and 17, respectively, which are of the same length and have corresponding end portions 18 and 19 thereof gradually flattened and offset inwardly at a predetermined angle to provide the converging exhaust throats 12, 13 and the restricted openings 14, 15 of said chambers.

The free ends of the flattened offset portions 18, 19 of cylinders 16, 17 are formed square with the longitudinal axis of the power generating apparatus, and the adjacent abutting inner wall portions of said cylinders at said ends are ground parallel with said axis. Accordingly, the adjacent separate openings 14, 15 are disposed in transverse alignment and close together, and the division between the chambers 10, 11 extends up to the point 20 at which point the openings 14, 15 merge together in a common rectangular shaped discharge throat or nozzle 21 having diverging side walls 22, and diverging top and bottom walls 23 and 24, respectively. The diverging nozzle 21 is welded or otherwise secured to the cylinders 16, 17. In the illustrated embodiment the smallest end of the diverging nozzle 21 is located directly at the merging point 20 of the openings 14, 15, and the area thereof is substantially equal to the combined areas of said openings. It will be understood, however, that the merging point 20 of the openings 14, 15 may be located relatively close to but not directly at the smallest end of the diverging nozzle 21 depending on the result desired.

The form and relative arrangement of the parts thus far described may be varied without affecting the mode of operation of the power generating apparatus or impairing the efficiency thereof. For example, the cylinders 16, 17 forming the chambers 10, 11, throats 12, 13, and openings 14, 15 may be a single casting and the diverging nozzle 21 formed as an integral part thereof.

For the sake of description, a diverging nozzle is defined as a passage of any shape or form wherein the cross-sectional area progressively increases from the inlet end to the outlet or discharge end.

In the normal operation of the power generating apparatus thus far described, the chambers 10, 11 are charged with an explosive mixture and fired in succession, the charging and firing of both chambers, first one and then the other, constituting one cycle of operation of the apparatus. By reason of the converging throats 12, 13 and restricted openings 14, 15, an elongated blast or jet of hot gas of high velocity and momentum will be discharged by each chamber 10, 11 upon firing of the explosive mixture therein, said jets of high velocity gases passing directly into the diverging nozzle 21 and concentrated therein for use as motive and destructive power, for heating, or any other desired useful purpose.

By virtue of the narrow or restricted openings 14, 15 and close association and location thereof at or very close to the point 20 which is at the smallest end of the diverging nozzle 21, the jet of hot gas discharged from chamber 10, for example, into nozzle 21 through opening 14 and moving at high velocity past the adjacent opening 15 of chamber 11 will create a pressure drop or vacuum in chamber 11, whereupon the combustion gases and the unburned residual fuel, if any, of a previous explosion are withdrawn or scavenged from chamber 11 into nozzle 21 and said residual fuel is fired therein by the jet of hot gas discharging from chamber 10 thus increasing the velocity of said jet, and a fresh explosive mixture is drawn into chamber 11 and carried towards the opening 15 thereof. As the explosive mixture in chamber 11 approaches the opening 15 of said chamber, it is ignited by the expiring jet of hot gas from chamber 10, whereupon chamber 11 fires and discharges an elongated blast or jet of hot gas of high velocity and momentum into nozzle 21 through opening 15 following dissipation of the jet discharged from chamber 10, thus completing one cycle of operation of the power generating apparatus. Thereupon, scavenging, recharging, and firing of chamber 10 is effected in the manner above described by the jet of hot gas discharged from chamber 11, and the above-described operations are repeated in the next and succeeding cycles, whereby elongated jets of hot gases of high velocity and momentum will be discharged from chambers 10, 11 into the diverging nozzle 21 in continuous rapid succession.

It will be noted that since the chambers 10 and 11 control and are dependent upon each other in the scavenging, charging and firing thereof, the power generating apparatus thus far described is self-charging and self-firing and, hence, requires no fuel charging means and ignition means in the normal operation thereof.

Located adjacent the rear of the power generating apparatus and extending transversely thereof is a common fuel intake manifold or cylinder 25 which is closed at one end and has secured thereto at the opposite end a conventional carburetor 26 of the proper capacity through which fuel of the proper explosive mixture is introduced into said manifold. Carburetor 26 comprises a fuel jet 27 communicating with the venturi 28, a fuel metering needle valve 29 and a fuel shut-off needle valve 30 associated with jet 27, a manually operated throttle valve 31, and a manually operated choke valve 32.

Intake manifold 25 is formed with two transversely spaced branch outlets 33 which have secured thereto sleeves 34 that project forwardly of said manifold into the cylinders 16 and 17 at the intake ends thereof and are fitted in said cylinders for axial sliding movement relative thereto for purposes to be hereinafter described. Each sleeve 34 is closed at its forward or outlet end by a conical wall 35 which is provided with two diametrically opposite outlet ports 36 of a predetermined area through which the proper quantity of fuel is admitted into chambers 10, 11 from manifold 25 for operation of the power generating apparatus. Disposed within cylinders 16, 17 and welded or otherwise suitably secured to the outlet ends of sleeves 34 in axial spaced relation therewith are curved baffles 37 which are of a diameter less than the internal diameters of said cylinders to permit entry of the fuel past the same into chambers 10, 11. Baffles 37 provide in effect one form of a tortuous passage for the incoming fuel and prevent the explosion wave fronts in chambers 10, 11 from striking back into manifold 25. It will be understood that the tortuous fuel passage may be formed in various other well-known ways and by other means of known design. Disposed between manifold outlets 33 and the ports 36 in sleeves 34 are screens 38 for preventing the flame front in chambers 10, 11 from igniting the explosive mixture in manifold 25, said screens also serving to cool the hot residual gases in chambers 10, 11 whereby all danger of backfire in manifold 25 is eliminated.

With the construction thus far described, the power generating apparatus is capable of operating effectively and efficiently at moderately high cycle speeds only, the minimum cycle speed within this range being the point at which the baffles 37 and tortuous passages created thereby will no longer be effective to prevent the explosion wave fronts from striking back into manifold 25. In order to enable operation of the power generating apparatus at slow cycle speeds as well as moderately high cycle speeds, valve means are provided for alternately opening and closing the fuel outlet ports 36 in sleeves 34, whereby said ports will be open when vacuum or subatmospheric pressure is created in chambers 10, 11, as hereinbefore described, to permit fuel to be drawn into said chambers, and will be closed upon firing of the chambers 10, 11, as hereinbefore described, to prevent the explosion fronts from striking back into manifold 25.

As shown, said valve means comprises a pair of flap valves 39 which are associated with each sleeve 34 and engage the conical wall 35 thereof to alternately open and close the ports 36 therein upon rotation thereof. Each pair of valves 39 is pivotally connected through the medium of arms 40 to the enlarged circular end 41 of a spindle 42. Spindle 42 extends through and is fitted for reciprocation in the bore 43 of a shaft 44 which extends longitudinally of the power generating apparatus through manifold 25 and is journalled in suitable bearings in the latter and in the sleeve 34. Bore 43 terminates at its forward or inner end in a larger diameter bore 45 to receive the enlarged end 41 of spindle 42, said bore being of a length greater than the length of spindle end 41 to enable axial movement of spindle 42 relative to shaft 44. Spindle 42 is connected with shaft 44 for rotation therewith and sliding axial movement relative thereto by suitable means, such as, a screw 46 which is threaded in shaft 44 and slidably engages a flattened portion 47 on spindle 42. The forward or inner ends of shafts 44 are slotted as indicated at 48 (Fig. 4) to straddle the arms 40 of valves 39 whereby rotation will be imparted to said valves by said shafts.

Rotation is imparted to shafts 44 and valves 39 by spur gears 49 which are fixed on the outwardly projecting ends of said shafts and mesh with an intermediate spur gear 50 that is journalled on manifold 25. Secured to or formed integrally with the intermediate gear 50 is a pulley 51 around which passes a belt 52 that is driven by an electric motor 52a or other suitable source of power. The pairs of valves 39 are maintained in engagement with the conical walls 35 of sleeves 34 by centrifugal force, and said valves are so positioned that when the ports 36 of one chamber are closed by one pair of valves to prevent the explosion front from striking back into manifold 25, the ports 36 of the other chamber are opened by the other pair of valves to permit fuel to be drawn therein from said manifold.

The pairs of valves 39 are rotated by the described driving means continuously and at a constant uniform speed which preferably overlaps the minimum cycle speed in the moderately high cycle speed range at which the valves are neither necessary nor desirable. Accordingly, through the provision of the valves 39, the power generating apparatus may be operated from idling speed up to and including the minimum cycle speed in the moderately high cycle speed range by manipulating the throttle valve 31. When the minimum cycle speed in the moderately high cycle speed range is reached, the pairs of valves 39 are drawn away from the conical walls 35 of sleeves 34 and, hence, rendered ineffective, whereupon operation of the power generating apparatus will continue without the aid of said valves at said minimum cycle speed and at still higher cycle speeds by further manipulating the throttle valve 31.

Means are provided for moving the pairs of valves 39 into and out of engagement with the conical walls 35 of sleeves 34 while said valves are rotating, whereby the change from valve operation to valveless operation for high cycle speeds and from valveless operation to valve operation for low cycle and idling speeds will be effected without interrupting the operation of the power generating apparatus. As shown, said means comprises a spool-like collar 53 which is secured to the outwardly projecting end of each spindle 42. Engaged with each collar 53 is the forked upper end of an arm 54 which is formed with a handle 55 and is pivotally mounted at 56 on a rearwardly extending bar 57 that is secured in any suitable manner to manifold 25.

It will thus appear that by grasping the handles 55 and swinging arms 54 in a counter-clockwise direction, as viewed in Fig. 1, about their pivots 56, spindles 42 will be moved axially toward the left, as viewed in Figs. 1 and 2, relative to shafts 44. Under these conditions, the arms 40 of valves 39 will be drawn into the enlarged bores 45 of shafts 44 and, hence, said valves will be cammed or drawn away from the conical walls 35 of sleeves 34 to inoperative positions substantially parallel with the axes of said shafts, thus presenting no interference to the passage of fuel from manifold 25 to chambers 10, 11 through ports 36 during valveless operation of the power generating apparatus at moderately high cycle speeds. The pressure exerted by the arms 40 on the walls of bores 45 under centrifugal force holds valves 39 in their retracted inoperated positions. When the spindles 42 are moved axially toward the right by the described means for this purpose, the arms 40 of valves 39 will be moved out of the bores 45 of shafts 44, whereupon said valves will swing under centrifugal force into engagement with the conical walls 35 of sleeves 34.

In order to effect operation of the power generating apparatus at a reasonable constant efficiency throughout its entire speed cycle range, means are provided for varying the volume of chambers 10, 11 as the quantity of fuel admitted therein under the control of the throttle valve 31 is varied. The volume of chambers 10, 11 in relation to the area of the throats 12, 13 affects the speed of the cycle, i. e., the smaller the chamber volume the faster the cycle and the greater the chamber volume the slower the cycle. Accordingly, when the throttle valve 31 is opened from idling speed, the volume of chambers 10, 11 is increased commensurate with the increase in the quantity of fuel admitted therein. Under these conditions, the cycle speed will not increase with each increase in the quantity of fuel admitted into chambers 10, 11, but instead will remain constant, the effective power of the high velocity gases generated by and discharged from the power generating apparatus will, however, increase with each increase in the quantity of fuel. Likewise, when the power generating apparatus is throttled down to idling speed, the volume of chambers 10, 11 is decreased commensurate with the decrease in the quantity of fuel admitted therein. Under these conditions, the cycle speed will still remain constant and will not decrease with each decrease in the quantity of fuel admitted into chamber 10, 11, but the effective power of the gases generated by and discharged from the power generating apparatus will, however, decrease with each decrease in the quantity of fuel.

In the illustrated embodiment the volume of chambers 10, 11 is decreased and increased by moving the sleeves 34 and valves 39 forwardly and rearwardly relative to cylinders 16 and 17 which in effect decreases and increases the length of said cylinders resulting in a decrease and increase in the volume of chambers 10, 11. For this purpose, the manifold 25 and all parts carried thereby and hereinbefore described are supported and guided for straight line forward and rearward movement by a strut or bar 58 which is welded or otherwise suitably secured to manifold 25 and extends downwardly therefrom. The lower end of strut 58 is slotted to receive one or more longitudinally extending guide bars 59 which are welded or otherwise suitably secured to a rearwardly extending platform 60 that is secured to or formed integrally with a cooling jacket 61 hereinafter referred to. Forward and rearward movement is imparted to manifold 25 and all parts carried thereby by suitable means, such as, an externally threaded rod or shaft 62 which is rotatably mounted at one end thereof on jacket 61 and is held against axial movement relative to said jacket by two collars 63. Rod 62 extends rearwardly from jacket 61 through and in threaded engagement with strut 58 and is provided at its rear free end with a hand-wheel 64. Thus, by rotating hand-wheel 64 and rod 62 in one direction, the sleeves 34 and valves 39 will be advanced relative to cylinders 16, 17, thereby decreasing the volume of chambers 10, 11, and by rotating said hand-wheel and said rod in the opposite direction, said sleeves and valves will be retracted relative to said cylinders, thereby increasing the volume of chambers 10, 11, said operation being effected simultaneously with the operation of the throttle valve 31. Any suitable known mechanical expedient may be employed to maintain the pulley 51 and belt 52 in driving relation with its driving means upon forward and rearward movement of manifold 25.

While chambers of a variable volume are the preferred arrangement to obtain satisfactory throttling of the power generating apparatus with constant speed valves, and operation of said apparatus at a reasonable constant efficiency, it will be understood that the same result may be accomplished with a fixed chamber volume, but at a sacrifice in efficiency, by rotating the valves 39 at variable speeds commensurate with the quantity of fuel admitted into chambers 10, 11.

Jacket 61 completely surrounds the cylinders 16, 17, and diverging nozzle 21 in spaced relation therewith and is welded or otherwise secured to said cylinders and nozzle to provide a fluid-tight unit. The jacket 61 forms a reservoir which is filled with a coolant, preferably liquid fuel, such as, fuel oil, so that the normally waste heat radiating from cylinders 16, 17, and nozzle 21 upon continued operation of the power generating apparatus may be utilized to convert said fuel into vapor which, in turn, is directed in a manner to be presently described to the carburetor 26 and used as the operating fuel for the said apparatus. For this purpose, jacket 61 is provided or formed at the top and centrally thereof with a pressure dome 65 which is disposed directly above the throats 12, 13 of chambers 10, 11 to collect and concentrate the fuel vapor therein under pressure. Secured to and communicating with the pressure dome 65 is a distributing manifold 66 having connected therewith one end of a rigid conduit 67 that extends downwardly from said manifold at one side of jacket 61. Connected with the opposite end of conduit 67 is a T-fitting 68 which has connected therewith corresponding ends of rigid branch conduits 69 and 70. The opposite ends of conduits 69, 70 are connected with a valve housing 71 at the top and one side thereof, respectively. Housing 71 is bolted to a suitable platform or support 72 on which is mounted the unit comprising the cylinders 16, 17, diverging nozzle 21, and jacket 61, said unit being supported on said platform by legs or uprights 73.

Valve housing 71 is formed with a large annular chamber 74 and with a reduced vertically extending bore 75 which is closed at its lower end and opens at its upper end into said chamber. Conduit 69 communicates with chamber 74 through a port 76 formed in housing 71, and conduit 70 communicates with bore 75 through a port 77 formed in said housing. Slidably mounted in the bore 75 of housing 71 is a pressure responsive plunger valve 78 which projects upwardly into chamber 74 and is formed with a reduced portion 79. Disposed within chamber 74 of housing 71 is a bellows 80 which is connected with the upper end of valve 78.

Connected with housing 71 at the side thereof opposite that containing the port 77 and conduit 70 is one end of a flexible main fuel feed conduit 81 the opposite end of which is connected with carburetor 26. Conduit 81 communicates with the bore 75 in housing 71 through a port 82, and communicates with the fuel jet 27 in carburetor 26 through a port 83 formed in said carburetor. Connected with housing 71 at the side thereof containing the port 77 and conduit 70 is one end of a rigid conduit 84 which communicates with the bore 75 in said housing through a port 85 spaced axially above the port 77. The opposite end of conduit 84 is connected with a conventional float chamber or bowl 86 into which gasoline or other volatile fuel is introduced from a supply tank 87 and maintained at a constant level by a float controlled needle valve unit 88 in a manner well understood in the art. Float bowl 86 is supported in any suitable manner on platform 72 and is connected with the gasoline supply tank 87 by a rigid conduit 89.

Plunger valve 78 is normally disposed in the position shown in Fig. 1 wherein it will be noted that the fuel vapor port 77 in housing 71 is closed by the lower enlarged end of said valve, and the gasoline port 85 in said housing is in communication with the main fuel feed conduit 81, through the bore 75, the reduced portion 79 of valve 78 and the port 82. Under these conditions, gasoline will be supplied to the carburetor 26 from tank 87 through conduit 89, float chamber 86, conduit 84, housing 71 and conduit 81 for initial starting and operation of the power generating apparatus. When the plunger valve 78 is forced downwardly by the pressure of the fuel vapor from pressure dome 65, the gasoline port 85 will be closed by the upper enlarged end of said valve, while the fuel vapor port 77 will be simultaneously placed in communication with the main fuel feed conduit 81 through the bore 75, reduced portion 79 of valve 78 and the port 82. Under these conditions, the supply of gasoline to carburetor 26 is interrupted and the fuel vapor from jacket 61 and pressure dome 65 is supplied to said carburetor for continued operation of the power generating apparatus. When the pressure of the fuel vapor drops, the plunger valve 78 will automatically return to its original position shown in Fig. 1, whereupon gasoline will again be supplied to carburetor 26 as hereinbefore described.

In order to replenish the fuel oil in jacket 61 as the same is converted into vapor and supplied to the carburetor 26, the distributing manifold 66 associated with pressure dome 65 has connected therewith one end of a rigid conduit 90 which extends downwardly from said manifold at one side of the power generating apparatus. The opposite end of conduit 90 is connected with a conventional jet injector 91 by means of which fuel oil received therein from a tank 92 or other source of fuel oil supply through a conduit 93 is forced into jacket 61 through a conduit 94 having one end connected with said jacket. Injector 91 is bolted to the platform 72. Fuel vapor feed conduit 90 is provided with a conventional shut-off valve 95 which is normally closed, and the fuel oil feed conduit 94 is provided with a conventional check valve 96 for preventing return flow of fuel oil from jacket 61. Thus, when it is desired to replenish the fuel oil in jacket 61 during the operation of the power generating apparatus, the valve 95 is opened whereupon the fuel vapor directed under pressure into injector 91 from pressure dome 65 through conduit 90 will force additional fuel oil from tank 92 past check valve 96 and through conduit 94 into jacket 61. When the fuel oil in jacket 61 has reached the proper level, the valve 95 is again closed until more fuel oil in jacket 61 is required at which time the above operations are repeated.

Carburetor 26 has connected therewith adjacent the air inlet end thereof a blower or compressor 97 which is used only to start the power generating apparatus in operation and may be of any known design. Blower 97 is secured to platform 72 or any other suitable support and is driven by an electric motor 72a controlled for starting and stopping purposes by suitable switch means. Blower 97 is connected with carburetor 26 by a flexible conduit 98 to enable forward and rearward adjustment of said carburetor, manifold 25 and sleeves 34 as hereinbefore described, without disturbing said connection. Pivoted at 99 within carburetor 26 is a flap valve 100 which is adapted to close the air inlet end of said carburetor and direct the air under pressure from blower 97 through the venturi 28, whereby gasoline mixed with said air will be forced into manifold 25 and thence into chambers 10, 11 for starting of the power generating apparatus. Valve 100 is normally disposed in the position shown in Fig. 2, i. e. across the outlet end of conduit 98, so as to present no interference to the passage of atmospheric air into carburetor 26 through the air inlet end thereof during normal operation of the power generating apparatus. Valve 100 is moved to operative position by air under pressure from blower 97, and is returned to its original position, upon stopping of said blower, by any suitable resilient means such as a spiral spring 99a on part 99.

In operating the power generating apparatus thus far described, assuming the valves 39 have been moved to operative positions and have been set in motion by motor 52a, the power generating apparatus is started by starting the blower 97. Thereupon, the air under pressure discharged from blower 97 in passing through carburetor 26 carries with it gasoline into manifold 25 and thence into one or the other of chambers 10, 11, whereupon said gasoline and air mixture is ignited by any suitable means, such as, by a spark plug 101 which is carried by the diverging nozzle 21 and is connected with any suitable high tension coil means. If desired, a spark plug 104 may be provided in one or the other or both chambers 10 and 11 and connected to any suitable known type of electrical energy. The spark plugs 104 are shown as being accessible through tubes 105 in jacket 61. As the explosive mixture in the one chamber is ignited or exploded a blast or jet of high velocity gas will be discharged from said chamber through its throat into the diverging nozzle 21. A pressure drop or vacuum will then be created in the opposing chamber whereupon a gasoline and air mixture is drawn into said chamber and ignited as hereinbefore described, thus completing one cycle. From this point on the power generating apparatus is self-charging and self-firing for repeated cycles and, hence, the blower 97 and spark plug 101 are no longer required whereupon said blower is stopped and said spark plug is rendered ineffective. The power generating apparatus may then be throttled, as desired, to increase the effective power of the high velocity gases discharged therefrom by manipulating the throttle valve 31 and simultaneously increasing the volume of chambers 10, 11.

When the power generating apparatus has been in operation for a period of time, heat will be transferred through the chamber and nozzle walls into jacket 61 and, hence, the liquid fuel oil therein will be raised to a boiling point which forms vapor that is collected in the pressure dome 65. When the pressure of the vapor in pressure dome 65 is sufficient, the valve 78 in response to said pressure will shift the fuel line to the carburetor jet from gasoline to fuel vapor leading from said pressure dome.

In order to increase the velocity of the gases discharged from the power generating apparatus and, hence, increase the effective power of said gases, a plurality of power boosters are provided and associated with the diverging nozzle 21. These power boosters, two being shown, but any desired number may be employed, are in the form of pipes or nozzles 102 which are welded or otherwise suitably secured to opposite sides of the diverging nozzle 21 and communicate with the interior thereof. Nozzles 102 are connected with the intake manifold 25 by flexible conduits 103 to receive from said manifold explosive mixture and direct the same into the diverging nozzle 21. Nozzles 102 are so positioned on diverging nozzle 21 that the explosive mixture will be directed into the latter at an angle and in the direction of movement of the high velocity gases through said nozzle. The operation of the boosters is such that as the gases pass through the diverging nozzle 21 at high velocity, said gases will draw into said nozzle additional explosive mixture from manifold 25 through conduits 103 and nozzles 102 whereupon said additional mixture will fire in the diverging nozzle and thus increase the velocity and effective power of the jets discharged from the power generating apparatus.

Although only a single embodiment of the present invention has been illustrated in the accompanying drawings and described in the foregoing specification, it is to be expressly understood that said invention is not limited to said embodiment or to the specific uses thereof referred to herein. Various changes may be made in the mechanical details, some of which have been suggested in the foregoing description, and in the design and arrangement of the parts illustrated without departing from the spirit and scope of the invention, as will now be apparent to those skilled in the art. It will also be understood that a plurality of the hereinbefore described power generating units may be combined in various arrangements and combinations to give specific operating characteristics, such as, for example, intensification or suppression of noise and vibration, and other characteristics which will be readily recognized by those skilled in the art. For a definition of the limits of the invention, reference is had primarily to the appended claims.

What is claimed is:

1. A power generating apparatus comprising at least two explosion chambers having discharge throats extending toward each other, said throats gradually decreasing in cross-sectional area from the inlet ends thereof and terminating at a common transverse plane in narrow elongated openings disposed close together and in parallel relation, and a diverging nozzle common to both said chambers and extending beyond said openings.

2. A power generating apparatus comprising at least two adjacent explosion chambers, and a common diverging nozzle into which said chambers discharge, said chambers gradually decreasing in cross-sectional area toward the smallest end of said nozzle and terminating at said end in adjacent openings the combined area of which is substantially equal to the cross-sectional area of the smallest end of said nozzle.

3. A power generating apparatus comprising at least two adjacent explosion chambers, and a common diverging nozzle into which said chambers discharge, said chambers gradually decreasing in cross-sectional area toward the smallest end of said nozzle and the end of the divsion between said chambers being located at the smallest end of said nozzle.

4. In apparatus of the character described, two elongated explosion chambers in substantially cylindrical form disposed in parallel relation, and a common diverging nozzle into which said chambers discharge, said chambers having discharge throats extending toward each other, and said throats gradually decreasing in cross-sectional area from the inlet ends thereof and terminating at the smallest end of said nozzle in elongated openings the combined area of which is substantially equal to the cross-sectional area of the smallest end of said nozzle.

5. A power generating apparatus comprising internal combustion means for producing in continuous rapid succession jets of gases of high velocity and momentum, means for supplying fuel of an explosive mixture to said combustion means, valve means for controlling the admission of explosive mixture into said combustion means, and means for rendering said valve means effective to control the admission of explosive mixture into said combustion means at intervals and ineffective to permit uninterrupted flow of explosive mixture into said combustion means.

6. A power generating apparatus comprising internal combustion means for producing in continuous rapid succession jets of gases of high velocity and momentum, means for supplying fuel of an explosive mixture to said combustion means, rotary valve means for controlling the admission of explosive mixture into said combustion means, means for rotating said valve means, and means operable during rotation of the valve means for rendering said valve means effective to control the admission of explosive mixture into said combustion means at intervals and ineffective to permit uninterrupted flow of explosive mixture into said combustion means.

7. Power generating apparatus including two identical explosion chambers tapering to elongated discharge slits in contiguous parallel position, and a single nozzle receiving the discharge from said slits and extending divergently outward therefrom.

8. Power generating apparatus including two identical explosion chambers of tubular section tapering to contiguous, elongated discharge slits opening, in substantially the same plane substantially perpendicular to the gas flow, into a single nozzle of generally rectangular section which has a receiving section of about the same size as the total area of the discharge slits and diverges outwardly therefrom.

9. The apparatus of claim 8 in which the slits are straight.

10. The apparatus of claim 8 in which the nozzle is provided with ignition means.

11. The apparatus of claim 8 in which the explosion chambers are provided with valves alternately communicating with an intake manifold.

12. The apparatus of claim 8 in which the nozzle is provided with ignition means and at least one supplementary burner supplied from an intake manifold and so directed as to be subject to suction by the passage of gases from said slits.

13. A power generating apparatus comprising at least two adjacent elongated variable volume explosion chambers having discharge throats terminating in adjacent restricted openings, means for supplying fuel of an explosion mixture into said chambers, throttle means associated with said fuel supplying means for increasing and decreasing the quantity of fuel introduced into said chambers, and means for increasing and decreasing the volume of said chambers commensurate with the increase and decrease, respectively, in the quantity of fuel introduced into said chambers.

14. In apparatus of the character described, internal combustion means for producing in continuous rapid succession jets of gases of high velocity and momentum, said means comprising at least two adjacent explosion chambers having discharge throats terminating in adjacent restricted openings, a common diverging nozzle communicating with said openings into and through which said jets of gases are discharged, means including a manifold connected with said chambers for supplying fuel of an explosive mixture to said chambers, booster means associated with said nozzle for introducing explosive mixture therein at an angle and in the direction of discharge of said jets of gases therethrough to increase the velocity and energy of said jets of gases, and means connecting said booster means with said manifold.

15. Power generating apparatus as defined in claim 1 wherein the smallest end of said nozzle is in said transverse plane.

References Cited in the file of this patent

UNITED STATES PATENTS

| | | |
|---|---|---|
| 617,753 | Le Pontois | Jan. 17, 1899 |
| 853,925 | Holzwarth | May 14, 1907 |

(Other references on following page)

UNITED STATES PATENTS

| | | |
|---|---|---|
| 1,014,332 | Rowbotham | Jan. 9, 1912 |
| 1,329,559 | Tesla | Feb. 3, 1920 |
| 1,405,482 | Bostedo | Feb. 7, 1922 |
| 1,542,056 | Guy et al. | June 16, 1925 |
| 2,078,957 | Lysholm | May 4, 1937 |
| 2,283,863 | Achterman | May 19, 1942 |
| 2,409,176 | Allen | Oct. 15, 1946 |
| 2,414,829 | McCollum | Jan. 28, 1947 |

FOREIGN PATENTS

| | | |
|---|---|---|
| 26,178 | Great Britain | Dec. 1, 1904 |
| 345,486 | France | Oct. 17, 1904 |
| 353,749 | France | July 6, 1905 |
| 365,042 | France | June 15, 1906 |
| 412,478 | France | May 3, 1910 |
| 844,442 | France | Apr. 24, 1939 |
| 316,773 | Italy | Apr. 14, 1934 |

OTHER REFERENCES

S. A. E. Journal, September 1946, pages 507, 508.